United States Patent [19]

Allen et al.

[11] Patent Number: 5,996,035
[45] Date of Patent: Nov. 30, 1999

[54] HOT-PLUG VOLTAGE AND POWER MANAGEMENT CONTROL USING DETECTED CONNECTION STATUS

[75] Inventors: Jonathan Michael Allen; Patrick Kevin Egan, both of Rochester, Minn.

[73] Assignee: International Business Machines Corporation, Armonk, N.Y.

[21] Appl. No.: 09/083,186

[22] Filed: May 22, 1998

[51] Int. Cl.[6] .............................. G06F 13/00; G06F 1/26; H01R 23/68; H05K 1/11

[52] U.S. Cl. ........................................... 710/103; 710/102

[58] Field of Search .................................. 710/102, 103, 710/131, 100, 101, 72, 129; 713/300, 500; 361/737, 781, 683, 686; 439/377, 636, 59; 327/288, 434, 537; 365/148, 149

[56] References Cited

U.S. PATENT DOCUMENTS

| | | | |
|---|---|---|---|
| 5,613,130 | 3/1997 | Teng et al. | 710/103 |
| 5,714,809 | 2/1998 | Clemo | 307/125 |
| 5,754,797 | 5/1998 | Takahashi | 710/103 |
| 5,768,541 | 6/1998 | Pan-Ratzlaff | 710/103 |
| 5,784,576 | 7/1998 | Guthrie et al. | 710/103 |
| 5,809,256 | 9/1998 | Najemy | 710/103 |

OTHER PUBLICATIONS

Solomon G, PCI Engineering Change Request—Addition of 3.3 Vaux signal to Connector. PCI Power Management Working Group ECR Advance Information. Date: May 21, 1997 (Last update: Oct. 27, 1997).

PCI Hot–Plug Specification, Revision 1.0. PCI Special Interest Group. Issue Date: Oct. 6, 1997.

*Primary Examiner*—Gopal C. Ray
*Attorney, Agent, or Firm*—Christopher H. Lynt; Matthew J. Bussan

[57] ABSTRACT

Hot-plugging and power management capabilities are simultaneously provided for a connector. Circuitry is provided to control a power management terminal so that it is powered up gradually and only after a device has been connected to the connector. The power management terminal is powered down when the device is disconnected from the connector under control of the circuitry. The power management voltage domain is isolated from the voltage domain of the system having the connector by further circuitry which also provides connection status lines.

20 Claims, 2 Drawing Sheets

HOT-PLUG VOLTAGE AND POWER MANAGEMENT CONTROL USING DETECTED CONNECTION STATUS

BACKGROUND OF THE INVENTION

1. Field of The Invention

The invention relates to the field of circuit interfacing and compatibility, and in particular to concurrent maintenance and hot-plugging of peripheral component interconnect (PCI) circuit cards.

2. Background Information

There are a variety of standard bus types and associated slot connectors currently in use in computer systems for interfacing with peripheral devices, including the currently popular PCI (Peripheral Component Interconnect) bus/slot standard, for example. Recently, new PCI bus specifications have been proposed, and two specifications, of particular interest are the "PCI Bus Hot Plug Specification 1.0" and "PCI Engineering Change Request—Addition of 3.3 V-AUX to connector," which can be individually used on a PCI slot.

Hot-plugging, sometimes also called "hot-swapping," refers to inserting and/or extracting a device while a system is "hot," i.e., powered-on. In mid-range to high-end computer systems, such as the IBM AS/400 (IBM and AS/400 are registered trademarks of International Business Machines Corporation, all rights reserved), because of the lost processing time and system overhead involved with shutting the system down, it is highly advantageous to be able to perform a number of maintenance operations on the computer system while the system is still running, and these operations are referred to as concurrent maintenance (CM) operations. In particular, failed or failing PCI circuit cards should be replaceable in a concurrent maintenance operation. The above-mentioned PCI Bus Hot Plug Specification provides a way of using standard PCI components in a system where the capability for hot-plugging of these components is to be made available.

The PCI BUS Hot-Plug Specification 1.0 Defines Hot Insertion as follows. A slot must be powered down and isolated from the bus before a PCI Adapter Card can be inserted. The process of making a slot ready, for insertion can vary from one platform and operating system to another. The following general sequence of steps is necessary to insert a PCI Adapter Card into a slot after it is powered down and ready for insertion. First, the user, e.g., computer system maintenance personnel, inserts the new Adapter Card. The user then notifies the Hot-Plug Service to turn on the slot containing the new Adapter Card. Next, the Hot-Plug Service issues a Hot-Plug Primitive to the Hot-Plug System Driver to turn on the appropriate slot. The Hot-Plug System Driver uses the Hot-Plug Controller to power up the slot; deassert RST# (reset) on the slot and connect the slot to the rest of the bus, in either order; and change the optional slot-state indicator to show that the slot is on.

The Hot-Plug Service notifies the operating system that the new Adapter Card is installed, so the operating system can initialize the Adapter Card and prepare to use it. Then, the Hot-Plug Service notifies the user that the card is ready.

The PCI Engineering Change Request, or "ECR," relating to power management mentioned above will now be explained. The PCI SIG Power Management Working Group has determined that in order to enable PCI bus power management to the full extent that the PCI Bus Power Management Interface Specification, Intel's Instantly Available PC and Microsoft's OnNow initiatives allow, PCI add-in devices need a dedicated and guaranteed source of power to keep the wake event card logic circuitry active while the rest of the PCI bus is without power. Power management includes shutting down a component that is not being used to place it in a standby condition in order to conserve energy, and then "waking up" the component by way of the wake event card logic circuitry when the component is needed. A previously reserved connector pin (14A) is proposed in this PCI ECR to be used as a 3.3 Vaux voltage supply to provide the standard source of power for the wake event card logic circuitry.

At least three assumptions have been made in this PCI ECR in determining the optimal solution for supplying auxiliary power to PCI add-in devices. The first was that add-in devices will need to function correctly in existing systems, which do not support Vaux, as well as in new Vaux capable systems. The second assumption was that the majority of add-in devices will not require Vaux. Because of this second assumption, the third assumption was that systems should not be required to provide Vaux capacity to handle worst case loading requirements.

The first and third assumptions have led to a need to provide mechanisms for budgeting the total available Vaux power, and for controlling the power consumption of Vaux capable devices. Power consumption of Vaux capable devices can be handled in one of two ways: either the motherboard could be designed to control Vaux current to individual slots, based on software control for example; or the add-in board could be made responsible for regulating its own current consumption based on software control, for example.

The PCI SIG Power Management working group selected the second option for this PCI ECR in view of the first two assumptions mentioned above. Therefore, add-in boards will need to be able to control their usage of Vaux to operate in legacy systems as well as in Vaux capable systems. The rationale is that, assuming the majority of cards will not need this capability, there is no need to burden an entire computer system with the cost for the capability. Cards which are designed to consume Vaux power will bear the costs for its incorporation.

The PCI SIG requirements for this 3.3 Vaux pin are that it meets the criteria set forth by the PCI SIG for defining a reserved pin. In particular, that it solves a long term need with broad application. The capabilities enabled by the PCI bus 3.3 Vaux pin address global energy utilization regulations that are becoming increasingly more important to buyers given the shortage of inexpensive, clean energy in many parts of the planet. The governmental energy regulations that will be supportable include but are not limited to Energy Star USA 30W standby.

The above-mentioned addition of a 3.3 V-AUX PCI pin as specified in the ECR, provides for PCI card power management support in a system, and the PCI Hot-Plug specification provides for a hot-plugging capability. However, a problem may arise if the two above-mentioned PCI bus features are used together on the same PCI slot.

From the Hot-Plug Specification, it can be seen that it specifies that the PCI slot in question is first powered down before the PCI card is inserted (or extracted). A PCI card should not, therefore, be hot-plugged directly into a PCI slot that has any pins "hot." This would include the 3.3 V-AUX pin of the PCI ECR, which pin is specified to be on even when the rest of the bus is powered down in order to keep wake event logic circuitry on a PCI card active.

Therefore, it is apparent that to use both the 3.3 Vaux pin capabilities, and hot-plug capabilities together, there needs to be a way that the 3.3 Vaux pin can be turned-on only after the PCI card is hot-plugged-in so as to comply with the PCI Hot Plug specification.

There is another PCI specification, the PCI Local Bus Specification 2.1, which provides for two PRSNTx# pins/signals which are used to indicate to the computer system that a PCI card is present in the PCI slot, and how much power the PCI card requires. Some defined signal combinations are set forth in the table below.

| PRSNT1# | PRSNT2# | Expansion Configuration |
|---|---|---|
| Open | Open | No Expansion board present |
| Ground | Open | Expansion board present, 25W max |
| Open | Ground | Expansion board present, 15W max |
| Ground | Ground | Expansion board present, 7.5W max |

According to this PCI specification for the PRSNTx# pins, in providing the power indication, the expansion board (PCI card) must indicate the total maximum power consumption for the board. The system must assume that the expansion board could draw this power from either the standard 5 V or 3.3 V power rail. Further, if the expansion board is configurable, e.g., it provides sockets for memory expansion, etc., the pin strapping (as defined in the above table) must indicate the total power consumed by a fully configured (expanded) board, which may be more power than that consumed in its usual shipping configuration.

As can be seen, one or both PRSNTx# pins/signals are grounded by a PCI card when inserted in a PCI slot, so at least one of the PRSNTx# pins/signals will be low (ground) if a PCI card is present in the PCI slot.

From the above, it is apparent that a need exists for a way to use both the hot-plug capability and the power management capability in a single system while conforming with PCI bus industry standards.

SUMMARY OF THE INVENTION

It is, therefore, a principle object of this invention to provide a method and apparatus for simultaneously enabling hot-plugging and power management.

It is another object of the invention to provide a method and apparatus that solves the above mentioned problems so that a PCI circuit card is not hot-plugged into a PCI slot that has a 3.3 Vaux pin hot.

These and other objects of the present invention are accomplished by the method and apparatus disclosed herein.

According to an aspect of the invention, hot-plugging and power management capabilities are simultaneously provided for in a connector. Circuitry is provided to control a power management terminal so that it is powered up gradually and only after a device has been connected to the connector. The power management terminal is powered down when the device is disconnected from the connector under control of the circuitry. The power management voltage domain is isolated from the voltage domain of the system having the connector by further circuitry which also provides connection status lines.

According to an aspect of the invention, the isolation is provided by a transistor circuit.

According to another aspect of the invention, the circuitry which controls the power management is a switch circuit which selectively and variably couples a power management voltage to a first connector terminal and a detection circuit which detects the connection status of at least one other terminal of the connector and controls the switch circuit.

According another aspect of the invention, the switch circuit is controlled to gradually apply the voltage to the first connector terminal upon detection of a connection at the at least one other terminal.

According to another aspect of the invention, the at least one other terminal includes two other terminals, and the detection circuit includes a logical AND circuit having respective inputs coupled to the two other terminals, and a timing circuit coupled between an output of the logical AND circuit and a control input of the switch circuit. If no connection is detected at either of the two other terminals, the timing circuit does not turn on the switch circuit. If a connection is detected at one of the two other terminals, the timing circuit gradually turns on the switch circuit to gradually apply the voltage to the first terminal.

According to another aspect of the invention, the timing circuit is a resistance and a capacitance connected to the logical AND gate output, and the switch circuit is a transistor having a control terminal coupled to a junction with the resistance and the capacitance so that a charge on the capacitance is applied to the control terminal of the transistor.

According to another aspect of the invention, the connector is a slot connector which is adapted to receive a card edge connector. The first terminal is a power management voltage terminal of the slot connector, and the two other terminals are card present signal terminals of the slot connector, at least one of which is grounded by insertion of a card edge connector in the slot connector.

According to another aspect of the invention, the slot connector is a peripheral component interconnect (PCI) connector.

According an aspect of the invention, there is provided a method for hot-plugging in a system having connector with a power management terminal.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
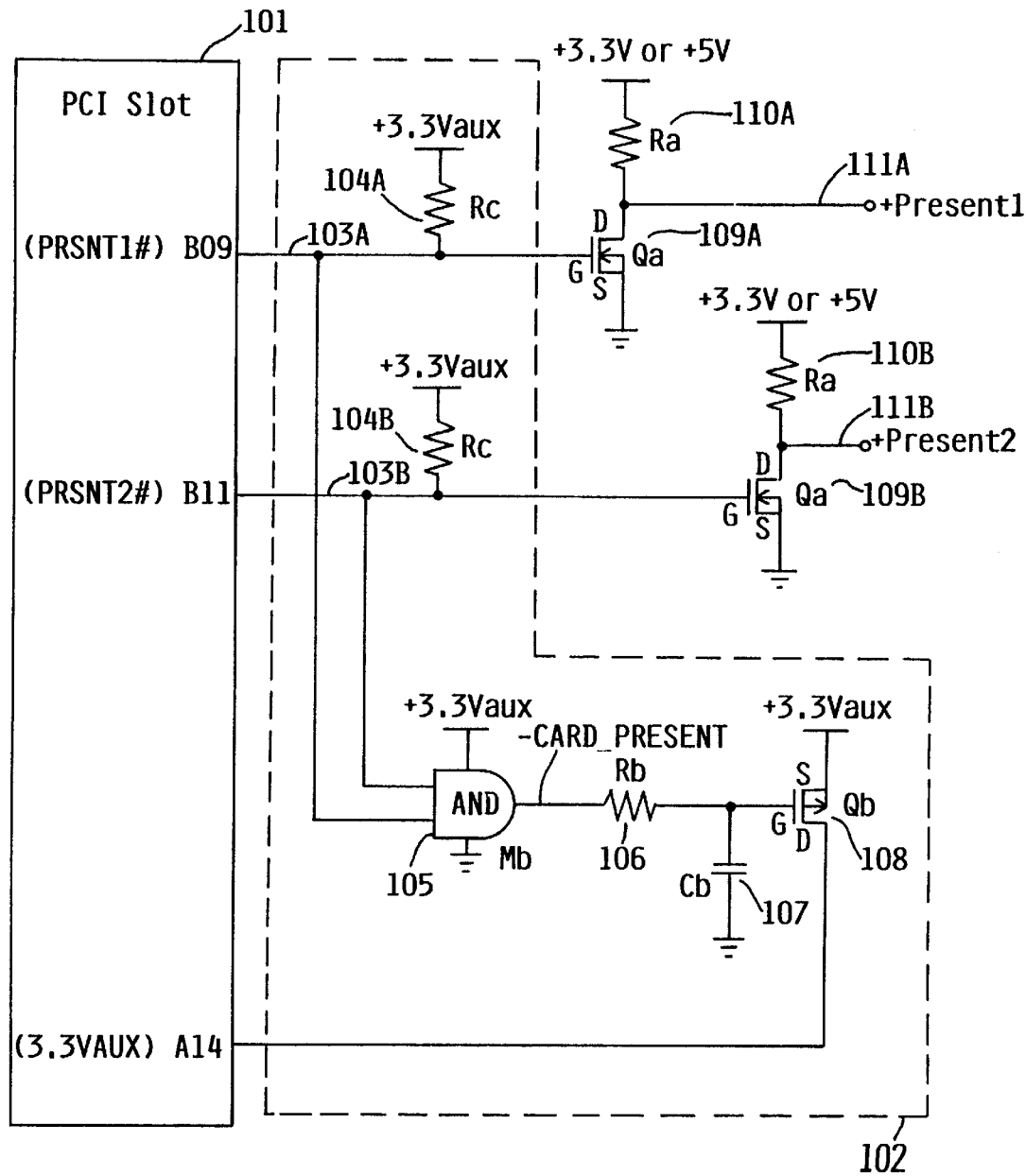
FIG. 1 illustrates circuitry according to an exemplary embodiment of the present invention.

An exemplary embodiment of circuitry according to the invention which permits incorporation of both hot-plugging and power management, and thereby overcomes the above-mentioned problems, is shown in FIG. 1. According to an advantageous feature of this exemplary embodiment of the invention, the PCI standard PRSNTx# pins, which indicate that a PCI card is present and what its power requirements are, are further used to control application 3.3 Vaux to the PCI ECR defined power management pin A14, such that pin A14 is only made hot after a PCI card is plugged into the PCI slot connector. The voltage is also removed from the A14 pin when a PCI card is removed from the slot connector.

In particular, as illustrated in FIG. 1, PCI slot 101 has two PRSNTx# pins B09 and B11, and a 3.3 Vaux pin A14 which are connected to the circuit arrangement 102 (enclosed in dashed lines) according to an exemplary embodiment of the invention. The arrangement shown controls the application of a 3.3 Vaux voltage to the A14 pin, as will now be explained in more detail.

A first PRSNTx# pin, i.e., the PRSNT1# B09 pin, of slot 101 is connected by line 103A to a voltage source providing the 3.3 Vaux voltage through a pull-up resistor (Rc) 104A. In this way, when no PCI card is plugged into slot 101, the PRSNT1# B09 pin is not grounded and line 103A floats at the voltage level of 3.3 Vaux. In a like manner, the PRSNT2# B11 pin is coupled by line 103B to a pull-up resistor 104B and the 3.3 Vaux source.

One or both PRSNTx# pins are grounded when a PCI card is inserted in slot 101, so at least one of the line 103A and 103B will be low (ground) if a PCI card is present in slot 101. Otherwise, the lines/pins float if no PCI card is plugged into slot 101, pulled-up to 3.3 Vaux by each of the resistors 103A and 103B, respectively.

An AND gate 105 is also coupled to line 103A and 103B. The output of the AND gate is labeled —Card_Present and is coupled to an RC circuit (Rb Cb) having a resistance 106 and a capacitance 107. The RC junction is coupled to the gate of a P-FET Qb 108. P-FET Qb 108 is off when no PCI card is plugged into slot 101 because the inputs to the AND gate 105, i.e., lines 103A and 103B, are at the 3.3 Vaux level, so that the output of the AND gate 105 (—Card_Present) is high (about 3.3 Vaux). The capacitance Cb 107 is thus charged to about 3.3 Vaux and this voltage is at the gate terminal of the N-FET 108.

When a PCI card is plugged into slot 101, the output of the AND gate 105, —Card_Present, toggles low (ground), and through the discharge of Cb 107 through Rb 106, P-FET Qb 108 is slowly turned on, allowing the +3.3 Vaux to reach the PCI card through slot 100 and pin A14.

In this way, the PRSNTx# pins/signals are used to turn-on the 3.3 Vaux to pin A14 of PCI slot 101 only after a PCI card has been inserted into slot 101.

When the PCI card is removed from slot 101, for example to perform a hot-swap concurrent maintenance operation, the output of the AND gate 105, i.e., —Card_Present, will toggle back high, and P-FET Qb 108 will turn off, so that the 3.3 Vaux pin A14 floats until the next PCI card is plugged into slot 101.

However, a design consideration in using the PRSNTx# pins/signals to control the 3.3 Vaux as described above is that these pins/signals are also used by the system to detect the presence of a PCI card and determine its power requirements, and the system uses a different voltage domain, i.e., 3.3 V or 5 V, which should be isolated from the 3.3 Vaux voltage domain. In other words, the PRSNTx# signals need to give present information in two different voltage domains, the 3.3 V or 5 V domain and the 3.3 Vaux domain, and these voltages domains should be isolated.

A resolution of this design requirement is also shown in the exemplary embodiment of FIG. 1. In particular, to provide isolation, N-FET Qa 109A and resistance Ra 110A are connected as illustrated to the first PRSNTx# line 103A, while N-FET Qa 109B and resistance Ra 109B are connected as illustrated to the second PRSNTx# line 103B.

When no PCI card is plugged into slot 101, line 103A floats and is pulled-up to 3.3 Vaux by pull-up resistor Rc 104A, as already described. The gate of N-FET Qa 109A is therefore at 3.3 Vaux and the N-FET is turned on. The signal line 111A, which provides the +Present1 signal to the system, is coupled to resistance Ra 110A and the N-FET Qa 109A so that when the N-FET is on, the +Present1 signal is low (approximately ground). However, when a PCI card is plugged into slot 101, if line 103A goes to ground, the N-FET 109A turns off, and the +Present1 signal goes high (3.3 V or 5 V), signaling the presence of the PCI card. A like connection is provided for line 103B by way of N-FET 109B and resistance 110B, so that signal line 111B, which provides the +Present2 signal to the system, behaves in the same way if line 103B goes low when a PCI card is plugged into slot 101.

Thus, the N-FET's 109A and 109B serve to isolate the two voltage domains, i.e., the 3.3 Vaux domain and the 3.3 V or 5 V domain, while still providing for a card present indication according to the PCI specifications.

As can be appreciated, because the circuit 102 for controlling the 3.3 Vaux only uses the 3.3 Vaux voltage, the power management circuitry, e.g., the wake event logic circuitry on a so-equipped PCI card, would be powered on gradually after the PCI card is plugged in to slot 101 during a hot-plug operation according to PCI specifications, i.e., when the rest of the PCI bus is powered down, and even when the computer system motherboard main power, i.e., the 3.3 V or 5 V discussed above, is off.

Alternatively, the motherboard main power could be used to power a circuit which controls the 3.3 Vaux, provided that similar measures such as those described above were used to isolate the main power from the 3.3 Vaux. Such an alternative circuit arrangement might be designed such that it would not provide the 3.3 Vaux power to pin A14 when the main motherboard power was off, however, there may be instances where this is not a consideration.

Other such circuits besides the illustrated exemplary embodiment could be used for the control of the 3.3 Vaux pin A14 using the PRSNTx# pins, as would be apparent to one skilled in the art, and these would be considered within the scope of the invention. For example, instead of field effect transistors (FET's), other types of switching devices could be used.

Figure 2:
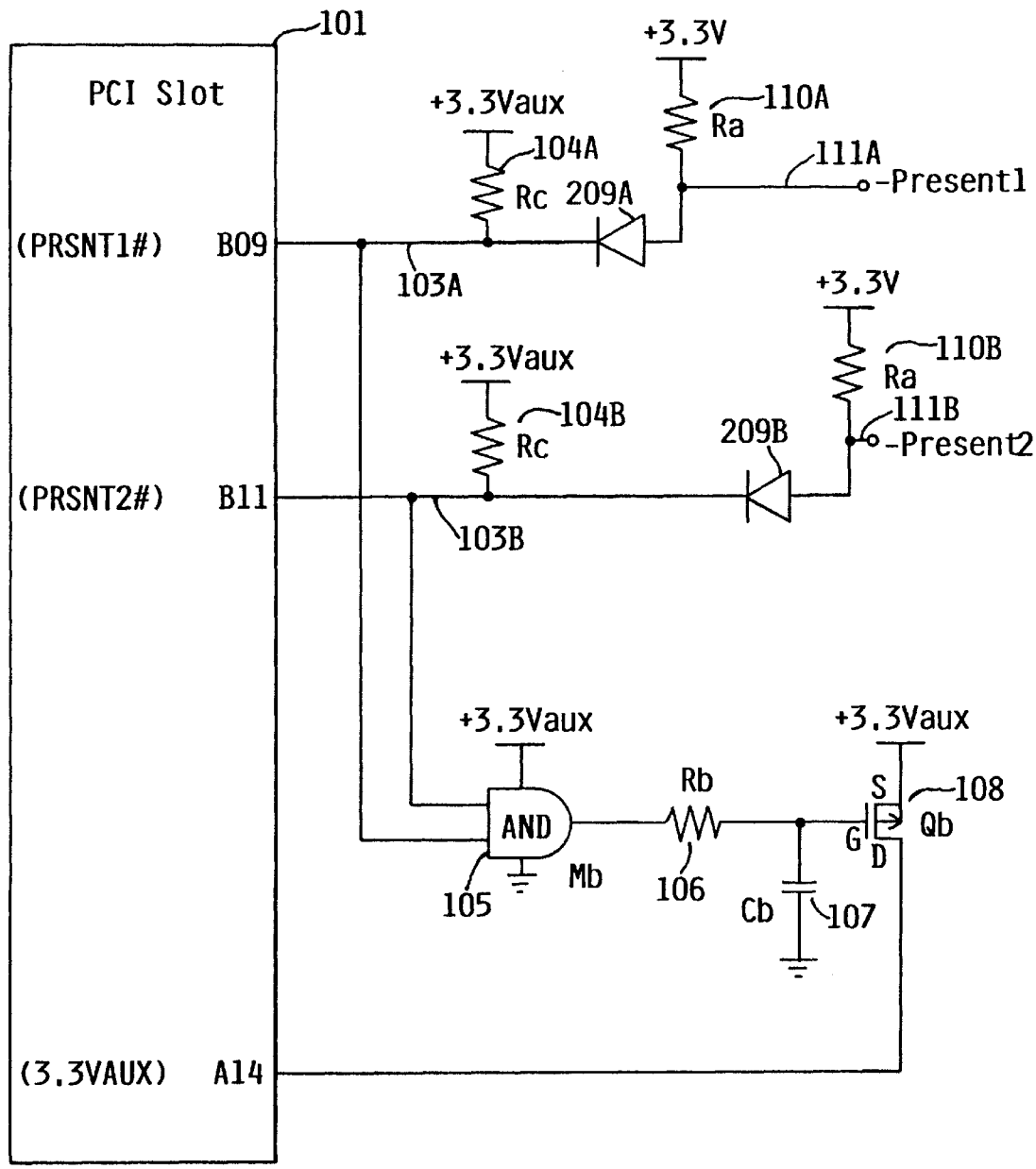
FIG. 2 illustrates circuitry according to another exemplary embodiment of the invention.

One alternate embodiment is illustrated in FIG. 2, in which, instead of the isolation N-FET's 109A and 109B of FIG. 1, diodes 209A and 209B are provided to isolate the voltage domains. This alternate embodiment is shown in the case where the system motherboard voltage domain is a 3.3 V level. In such an arrangement, when a PCI card grounds a respective line 103A or 103B, the respective diode 209A or 209B would be on, and the signal at a respective –Presentx line 111A or 111B would be approximately ground potential, a logic low. When no PCI card was plugged into slot 101, then lines 103A and 103B would float pulled-up to 3.3 Vaux by pull-up resistors 104A and 104B, respectively, and the diodes 209A and 209B would be off, meaning the voltages at lines 111A and 111B would be pulled-up by resistors 110A and 110B, respectively, to the motherboard 3.3 V level.

As can be appreciated, in this alternate embodiment using diodes, if the motherboard power source is 5 V, the diodes 209A and 209B could be on even when no PCI card was plugged into slot 101 due to the 1.7 V difference between the 3.3 Vaux on one side of a diode and the 5 V on the other side. The voltages at lines 111A and 111B would therefore be dependent on the voltage drops of resistances 104A and 104B, and 110A and 110B, when the respective diodes 209A and 209B are on. As where the motherboard source is 3.3 V, in the case where it is 5 V, when a PCI card is plugged in to the slot 101, grounding one side of the diode 209A and/or 209B, the voltage at lines 111A and/or 111B would be at approximately ground, disregarding the small diode voltage drop.

In another alternative (not shown), where the motherboard system does not use the PRSNTx# signals, these signal lines 103A/103B could be shorted together and the AND gate 105 substituted with a pull-up on the gate of P-FET Qb 108, as would be appreciated by one skilled in the art.

It should also be appreciated that the present invention can be used when no power is applied to the system, i.e., neither main power nor aux power is applied, when only aux power is applied, and when full power, i.e., main and aux, is applied to the system. In the case of no power being applied to the system, the circuits clearly have no effect on inserting or extracting a PCI card. In the case where only aux power is applied, as well as where full power is applied to the system, since the exemplary embodiment of the invention uses only aux power for controlling the applying of the 3.3 Vaux to the A14 pin, the control is still effective in either case.

The PCI bus specifications and ECR mentioned at the outset are relatively new and PCI Hot-Plugging is also relatively new to the industry. Users who wish to have both PCI Hot-Plug and PCI Power Management support benefit from a solution according to the invention. Both PCI Hot-Plug and PCI Power Management support are advantageously provided for by incorporation of a circuit for controlling the 3.3 Vaux according to the invention.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

For example, although the illustrated embodiment uses an AND gate, as would be apparent to those skilled in the art, other logic circuits could be used with appropriate modifications to other parts of the circuitry. Further, although an RC circuit is used to slowly turn on an FET and thereby slowly apply the 3.3 Vaux voltage to the A14 pin, as would be appreciated by those skilled in the art, other arrangements which act to slowly apply the voltage could be used interchangeably.

The invention was described with respect to PCI technology and standards, however, it could easily have applicability to other card technologies existent and under development, and should not be considered as limited to the PCI embodiment disclosed herein.

What is claimed is:

1. In a circuit board having a connector for use in connecting to a removable device, an apparatus, disposed on the circuit board, for controlling application of a voltage of the circuit board to a first connector terminal based on the connection status of at least one other terminal of the connector, comprising:

an electronic switch circuit, disposed on the circuit board, which selectively and variably couples the voltage to the first connector terminal; and a detection circuit, disposed on the circuit board, which detects the connection status of the at least one other terminal and electronically controls the electronic switch circuit;

wherein, the electronic switch circuit is controlled to gradually apply the voltage to the first connector terminal upon detection of a connection at the at least one other terminal.

2. A method of controlling voltage to a first terminal of a connector comprising utilizing the apparatus of claim 1.

3. An apparatus for controlling application of a voltage to a first connector terminal based on the connection status of at least one other terminal of the connector, comprising:

a switch circuit which selectively and variably couples the voltage to the first connector terminal; and a detection circuit which detects the connection status of the at least one other terminal and controls the switch circuit;

wherein, the switch circuit is controlled to gradually apply the voltage to the first connector terminal upon detection of a connection at the at least one other terminal;

wherein the at least one other terminal comprises two other terminals;

wherein the detection circuit comprises a logical AND circuit having respective inputs coupled to the two other terminals, and a timing circuit coupled between an output of the logical AND circuit and a control input of the switch circuit, wherein, if no connection is detected at either of the two other terminals, the timing circuit does not turn on the switch circuit; and wherein if a connection is detected at one of the two other terminals, the timing circuit gradually turns on the switch circuit to gradually apply the voltage to the first terminal.

4. The apparatus according to claim 3, wherein the timing circuit comprises a resistance and a capacitance connected to the logical AND gate output, and wherein the switch circuit comprises a transistor having a control terminal coupled to a junction with the resistance and the capacitance so that a charge on the capacitance is applied to the control terminal of the transistor.

5. The apparatus according to claim 4, wherein the connector comprises a slot connector which is adapted to receive a card edge connector, wherein the first terminal comprises a power management voltage terminal of the slot connector, and wherein the two other terminals comprise card present signal terminals of the slot connector, at least one of which is grounded by insertion of a card edge connector in the slot connector.

6. The apparatus according to claim 5, wherein the slot connector comprises a peripheral component interconnect (PCI) connector.

7. The apparatus according to claim 5, wherein the voltage comprises a power management voltage, wherein the card present signal terminals are coupled through respective resistances to the power management voltage, the apparatus further comprising isolation circuitry coupled to the card present signal terminals to isolate the power management voltage from a main motherboard voltage while supplying respective card present signals corresponding to the connection status of the respective card present signal terminals to the motherboard.

8. The apparatus according to claim 7, wherein the power management voltage is 3.3 volts, and wherein the main motherboard voltage is one of 3.3 volts or 5.0 volts.

9. The apparatus according to claim 8, wherein the isolation circuitry comprises at least one transistor coupled to each card present signal terminal.

10. The apparatus according to claim 9, wherein the switch circuit transistor comprises a field effect transistor, and wherein the at least one isolation transistor comprises at least one field effect transistor.

11. The apparatus according to claim 8, wherein the isolation circuitry comprises at least one diode coupled to each card present signal terminal.

12. In a circuit board having a connector for use in connecting to a removable device, a method of controlling the connector, comprising:

detecting whether a removable device is connected to the connector; and controlling a power management terminal of the connector so that the power management terminal is powered up gradually after detecting that a removable device is connected to the connector.

13. The method according to claim 12, further comprising:

powering down all terminals of the connector to enable a hot-plugging insertion or extraction of a device to the connector prior to the detecting;

whereby hot-plugging and power management capabilities are simultaneously accommodated.

14. The method according to claim 13, further comprising:

detecting that a device has been disconnected from the connector; and powering down the power management terminal when a device is detected as having been disconnected from the connector.

15. A method controlling a connector, comprising:

detecting whether a device is connected to the connector; and controlling a power management terminal of the connector so that the power management terminal is powered up gradually after detecting that a device is connected to the connector;

powering down all terminals of the connector to enable a hot-pluging insertion or extraction of a device to the connector prior to the detecting;

whereby hot-plugging and power management capabilities are simultaneously accommodated;

detecting that a device has been disconnected from the connector;

powering down the power management terminal when a device is detected as having been disconnected from the connector;

isolating a power management voltage domain from a voltage domain of a system having the connector; and providing the system with a signal when a device is detected as being connected to or disconnected from the connector.

16. The method according to claim 15, wherein the detecting comprises:

determining a voltage level of at least one terminal of the connector other than the power management terminal.

17. The method according to claim 15, wherein the detecting comprises:

determining a voltage level of two terminals of the connector other than the power management terminal; and wherein the controlling comprises:

performing a logical operation on the determined voltage levels; and operating a timing circuit based on a result of the logical operation.

18. The method according to claim 17, wherein the controlling further comprises:

gradually opening or closing a switch circuit with the timing circuit, to thereby provide power to the power management terminal.

19. The method according to claim 18, wherein the connector is a peripheral component interconnect (PCI) connector.

20. The method according to claim 19, wherein the logical operation comprises an AND operation.

* * * * *